(12) United States Patent  
Seita

(10) Patent No.: US 8,618,437 B2  
(45) Date of Patent: Dec. 31, 2013

(54) OPTICAL APPARATUS AND MANUFACTURING METHOD THEREOF

(75) Inventor: Masato Seita, Saitama (JP)

(73) Assignee: Canon Kabushiki Kaisha (JP)

( * ) Notice: Subject to any disclaimer, the term of this patent is extended or adjusted under 35 U.S.C. 154(b) by 934 days.

(21) Appl. No.: 11/772,793

(22) Filed: Jul. 2, 2007

(65) Prior Publication Data

US 2008/0093348 A1    Apr. 24, 2008

(30) Foreign Application Priority Data

Jul. 10, 2006    (JP) .................................. 2006-189623

(51) Int. Cl.
*B23K 26/20* (2006.01)
*B29D 11/00* (2006.01)
*G02B 7/02* (2006.01)

(52) U.S. Cl.
CPC .......... *B29D 11/00009* (2013.01); *G02B 7/021* (2013.01); *G02B 7/02* (2013.01)
USPC ....................... 219/121.63; 396/114; 359/811

(58) Field of Classification Search
USPC ........ 359/811, 819, 822; 351/178; 219/121.6, 219/121.65, 121.66; 385/88, 92
See application file for complete search history.

(56) References Cited

U.S. PATENT DOCUMENTS

| 6,195,214 | B1 * | 2/2001 | Muray et al. ................... | 359/819 |
| 2005/0243443 | A1 * | 11/2005 | Yamamoto et al. ............ | 359/819 |

FOREIGN PATENT DOCUMENTS

| JP | 7-113936 A | | 5/1995 | |
| JP | 2003-123506 | * | 4/2003 | ............... F21S 8/10 |
| JP | 2003-136599 A | | 5/2003 | |
| JP | 2005-049599 A | | 2/2005 | |
| JP | 2005-292441 | * | 10/2005 | ............... G02B 7/02 |
| JP | 2005-292441 A | | 10/2005 | |
| JP | 2006-011234 A | | 1/2006 | |

* cited by examiner

*Primary Examiner* — Henry Yuen
*Assistant Examiner* — Thien S Tran
(74) *Attorney, Agent, or Firm* — Rossi, Kimms & McDowell LLP

(57) ABSTRACT

An optical apparatus is disclosed which is capable of adjusting spacing between an optical member and a holding member or between optical members virtually without changing irradiation conditions of laser, and thus achieving reduction of joining time and improvement of positional accuracy at low cost. The apparatus includes an optical member, a thermomelting member, a spacing adjustment member and a holding member in this order. A first weld portion welding the spacing adjustment member and the holding member is formed therebetween, the first weld portion having been formed by heat generation of the holding member irradiated with the laser light transmitted through the optical member, the thermomelting member and the spacing adjustment member, and a second weld portion welding the spacing adjustment member and the optical member is formed therebetween, the second weld portion having been formed by the thermomelting member melted with heat transferred from the holding member.

11 Claims, 12 Drawing Sheets

OPTICAL APPARATUS AND MANUFACTURING METHOD THEREOF

BACKGROUND OF THE INVENTION

The present invention relates to an optical apparatus in which optical members such as lenses are fixed with respect to a holding frame and other lenses using laser light, and the manufacturing method thereof.

Recently, digital cameras have become widespread such as to be mounted on mobile phones, and there have been growing demands for smaller sizes and higher accuracies thereof. Moreover, as prices of digital cameras have gone down, it has become important to reduce the manufacturing cost by such as reducing the number of parts or improving the assembly process.

On the other hand, although parts with higher accuracies are required as the number of parts of a digital camera is reduced, there is a limit on the finishing accuracy of parts and the man-hour for adjustment in the assembly process tends to be increased. Particularly, since many adjustment processes are required in the assembly process of lenses which have a most significant effect on the camera performance, there is need for an assembly method of lenses which allows to perform adjustment with more ease and higher accuracies.

Accordingly, there has been proposed a technique for adjusting the spacing of lenses in which the lenses are fixed at an optimal position by varying the position of a lens in the optical axis thereof by rotating a ring-like adjustment component provided with a plurality of lens receiving surfaces in the assembly process of lenses (see Japanese Patent Laid-Open No. 2005-49599).

There has also been proposed a technique for adjusting the lens spacing in which a sheet-like spacing adjustment plate to be interposed between lenses is provided with a plurality of projection-and-depression shapes to follow the curved surface shape of a lens (see, for example, Japanese Patent Laid-Open No. 07-113936).

Then, after adjusting the lens spacing, it is necessary to fix the lenses while keeping the positional accuracy of the lenses, but in a conventional fixing method by use of an adhesive, it would take time for the adhesive to cure. For example, in the case of a typically used ultraviolet-curing adhesive, it would take not less than 10 seconds from coating until curing of the adhesive, and may take not less than one minute until the curing is completed.

For this reason, there has been a problem in that the lens position is changed in the period from coating of an adhesive till curing thereof or the adhesive shrinks during curing, thereby causing a deviation of the fixing position of the lens.

Then, in order to reduce the fixing time of lenses, there has been proposed a method in which a resin lens is provided with an infrared absorptivity and resin lenses or a resin lens and a resin lens frame are fixed in a few seconds using an infrared laser without using an adhesive (see Japanese Patent Laid-Open No. 2005-292441).

However, in the above described Japanese Patent Laid-Open No. 2005-292441, it is necessary that resin lenses are provided with an infrared absorptivity, and the technique can not be applied to lenses which are not provided with an infrared absorptivity.

Under such circumstances, the applicants of the present invention have proposed a method in which a hot-melt agent is disposed between a lens and a lens frame, and the lens frame and the hot-melt agent are subjected to laser irradiation to be instantly heated up so that the hot-melt agent is turned into an adhesive, thereby fixing the lens to the lens frame.

According to this lens fixing method, it is possible to reduce the fixing time of lenses even when the lenses are not provided with an infrared absorptivity, thereby improving the positional accuracy of the lenses. In the above described lens fixing method, when adjusting the spacing between the lens and the lens frame, it may be possible to adjust the spacing between the lens and the lens frame by changing the thickness of the hot-melt agent.

However, when a hot-melt agent of a certain thickness is used to adjust the spacing between the lens and lens frame, it is necessary to change the laser irradiation condition to make the hot-melt agent exert an adhesive property appropriately.

That is, since changing the thickness of hot-melt agent will change the proportion of laser absorption/scattering of the hot-melt agent itself, the intensity of laser which is transmitted through the hot-melt agent will be significantly varied, thereby making it necessary to change the condition of laser to be irradiated.

In this case, if the adjustment spacing between the lens and the lens frame is in a certain range, it may be possible to cope with the above described situation, but if the spacing is changed for example from 20 µm to 40 µm, the irradiation energy needs to be increased by about two times, thereby leading to an upsizing of the laser apparatus. Also, an attempt to cope with that situation by increasing the irradiation time of laser by about two times will also lead to the increase in the time needed for the assembly process of lens.

Further, in order to produce a hot-melt agent for which laser irradiation condition needs not be changed even when the thickness thereof is varied, it is necessary to change the property of each hot-melt agent with a different thickness, which will lead to an increase in manufacturing cost.

Moreover, since hot-melt agents have a lower rigidity compared with materials used for lens frames (for example, polycarbonate), and also have a large coefficient of thermal expansion, they are likely to undergo thermal deformation. Therefore, as the thickness of the hot-melt agent increases, it is more likely to undergo dimensional changes, thereby increasing the risk of degrading the positional accuracy of the lens.

BRIEF SUMMARY OF THE INVENTION

The present invention provides an optical apparatus and the manufacturing method thereof which are capable of adjusting spacing between an optical member and a holding member or between optical members virtually without changing irradiation conditions of laser, and thus achieving reduction of joining time and improvement of positional accuracy at low cost.

The present invention according to an aspect provides an optical apparatus which includes in the following order: an optical member which transmits laser light; a thermomelting member which transmits the laser light; a spacing adjustment member which transmits the laser light; and a holding member which generates heat by being irradiated with the laser light. A first weld portion welding the spacing adjustment member and the holding member is formed therebetween, the first weld portion having been formed by heat generation of the holding member irradiated with the laser light transmitted through the optical member, the thermomelting member and the spacing adjustment member, and a second weld portion welding the spacing adjustment member and the optical member is formed therebetween, the second weld portion having been formed by the thermomelting member melted with heat transferred from the holding member.

The present invention according to another aspect provides an optical apparatus which includes in the following order: an optical member which transmits laser light; a first thermomelting member which transmits the laser light; a spacing adjustment member which transmits the laser light; a second thermomelting member which generates heat by being irradiated with the laser light; and a holding member. A first weld portion welding the spacing adjustment member and the holding member is formed therebetween, the first weld portion having been formed by the second thermomelting member thermally melted by irradiation of the laser light transmitted through the optical member, the first thermomelting member and the spacing adjustment member, and a second weld portion welding the spacing adjustment member and the optical member is formed therebetween, the second weld portion having been formed by the first thermomelting member melted with heat transferred from the second thermomelting member.

The present invention according to yet another aspect provides an optical apparatus which includes in the following order: a first optical member which transmits laser light; a first thermomelting member which generates heat by being irradiated with the laser light; a spacing adjustment member which transmits the laser light; a second thermomelting member which generates heat by being irradiated with the laser light; and a second optical member which transmits the laser light. A first weld portion welding the spacing adjustment member and the first optical member is formed therebetween, the first weld portion having been formed by the first thermomelting member thermally melted by irradiation of the laser light transmitted through the first optical member, and a second weld portion welding the spacing adjustment member and the second optical member is formed therebetween, the second weld portion having been formed by the second thermomelting member thermally melted by irradiation of the laser light transmitted through the second optical member.

The present invention according to still yet another aspect provides a method of manufacturing an optical apparatus which includes a step of disposing in the following order: an optical member which transmits laser light, a thermomelting member which transmits the laser light, a spacing adjustment member which transmits the laser light, and a holding member which generates heat by being irradiated by the laser light; and a joining step of irradiating the laser light toward the optical member. In the joining step, a first weld portion welding the spacing adjustment member and the holding member is formed therebetween by causing the holding member to generate heat by irradiation of the laser light transmitted through the optical member, the thermomelting member and the spacing adjustment member, and a second weld portion welding the spacing adjustment member and the optical member is formed therebetween by the thermomelting member melted by heat transferred from the holding member.

The present invention according to further another aspect provides a method of manufacturing an optical apparatus which includes a step of disposing in the following order: an optical member which transmits laser light, a first thermomelting member which transmits the laser light, a spacing adjustment member which transmits the laser light, a second thermomelting member which generates heat by being irradiated with the laser light, and a holding member; and a joining step of irradiating the laser light toward the optical member. In the joining step, a first weld portion welding the spacing adjustment member and the holding member is formed therebetween by the second thermomelting member thermally melted by irradiation of the laser light transmitted through the optical member, the first thermomelting member and the spacing adjustment member, and a second weld portion welding the spacing adjustment member and the optical member is formed therebetween by the first thermomelting member melted by heat transferred from the second thermomelting member.

The present invention according to still further another aspect provides a method of manufacturing an optical apparatus which includes a step of disposing in the following order: a first optical member which transmits laser light, a first thermomelting member which generates heat by being irradiated by the laser light, a spacing adjustment member which transmits the laser light, a second thermomelting member which generates heat by being irradiated by the laser light, and a second optical member which transmits the laser light; and a joining step of irradiating the laser light toward the first and second optical members. In the joining step, a first weld portion welding the spacing adjustment member and the first optical member is formed therebetween by the first thermomelting member thermally melted by irradiation of the laser light transmitted through the first optical member, and a second weld portion welding the spacing adjustment member and the second optical member is formed therebetween by the second thermomelting member thermally melted by irradiation of the laser light transmitted through the second optical member.

Other objects and features of the present invention will be apparent from the preferred embodiments described below with reference to the drawings.

DETAILED DESCRIPTION OF THE PREFERRED EMBODIMENTS

The preferred embodiments of the present invention will now be described with reference to the accompanying drawings.

Embodiment 1

Figure 1:
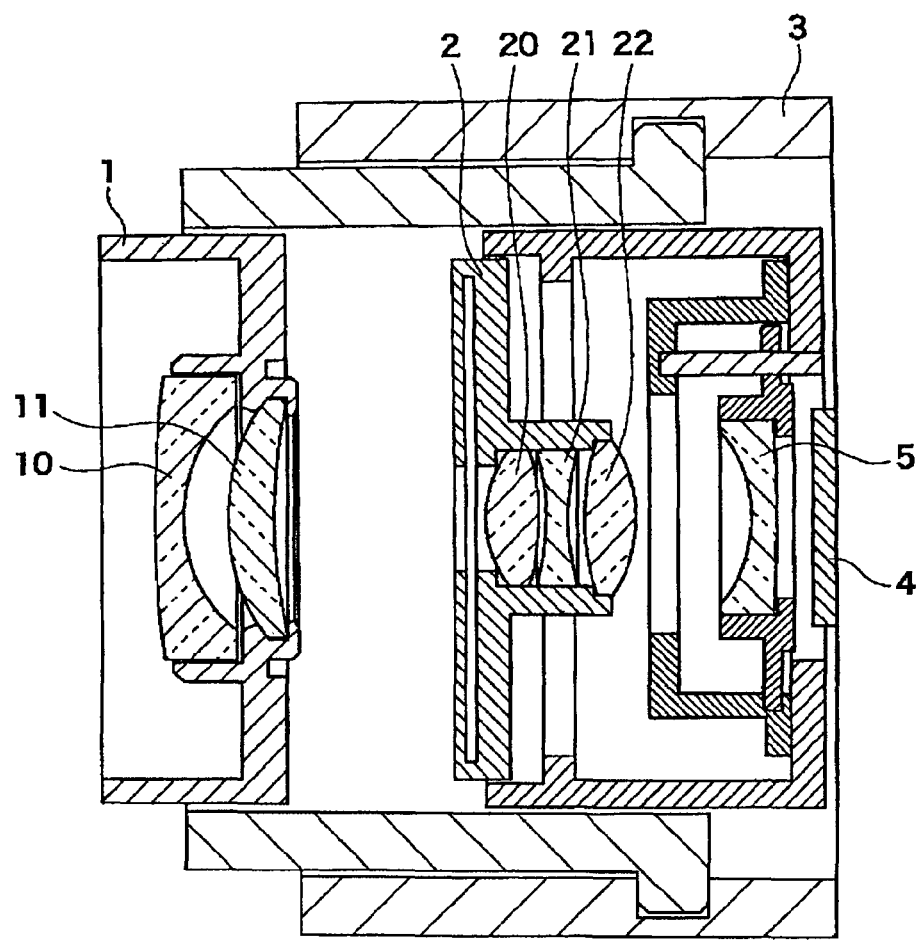
FIG. 1 is a sectional view showing an example of a lens barrel of a digital camera that is an embodiment of the present invention.

First, referring to FIG. 1, a lens barrel of a digital camera (optical apparatus) that is an embodiment of the present invention will be described.

In the lens barrel 3, a lens frame 1 for a first lens unit is fixed, onto which a lens 10 and a lens 11 adjusted to have a predetermined spacing are fixed, the first lens unit locating closest to an object.

Further, a lens frame 2 for a second lens unit is disposed in the rear of the lens frame 1, onto which a lens 20, a lens 21 and a lens 22 adjusted to have a predetermined spacing are fixed. A third lens unit 5 and an image-pickup element 4 are disposed in the rear of the lens frame 2. The first, second and third lens units constitute an image-pickup optical system. In the image-pickup optical system, zooming is performed by the movement of the lens frame 1 and the lens frame 2 in an optical axis direction, and focusing is performed by the movement of the lens 5.

Referring to materials of parts which constitutes the lens barrel, in recent digital cameras, making the lens frames for fixing lenses using resins is the mainstream, and polycarbonate is widely used in consideration of strength and sliding property. Further, to provide a light-shielding property and an anti-reflection property to the lens frames, resins containing carbon black are commonly used.

Further, as to the material for lenses, although resin materials are developed and resin lenses are used, glass lenses are still the mainstream when attaching importance to optical performances. In the present embodiment, a glass lens is used.

The fixing position of a lens may vary by several tens of μm in the optical axis direction depending on the finishing accuracy of lens frames and lenses. Therefore, in the following embodiments, a spacing adjustment sheet made of resin (laser-transmissive sheet) is interposed between the lens frame and the lens or between the lenses.

Several kinds of spacing adjustment sheets are prepared, each of which has a thickness difference of 10 μm, and of which thicknesses are for example 30 μm, 40 μm, 50 μm, etc.

Though the selection method of the sheet is not limited herein, since it is supposed to absorb variations due to production lots of the lens frames and the lenses, the geometries of the lens frame and lens may be measured in advance so that the spacing adjustment sheet can be selected depending on the measured geometry for each lot. Only when the spacing of lenses is inappropriate in assembly of the lens barrel, reassembling the lens barrel after replacing the sheet by one having a different thickness enables to reduce defective products. Accordingly, even for adjusting the spacing of lenses, it is not necessary to perform assembly by replacing the spacing adjustment sheet for each camera.

Now, referring to FIGS. 2 to 6, a lens fixing method that is Embodiment 1 of the present invention will be described.

Figure 2:
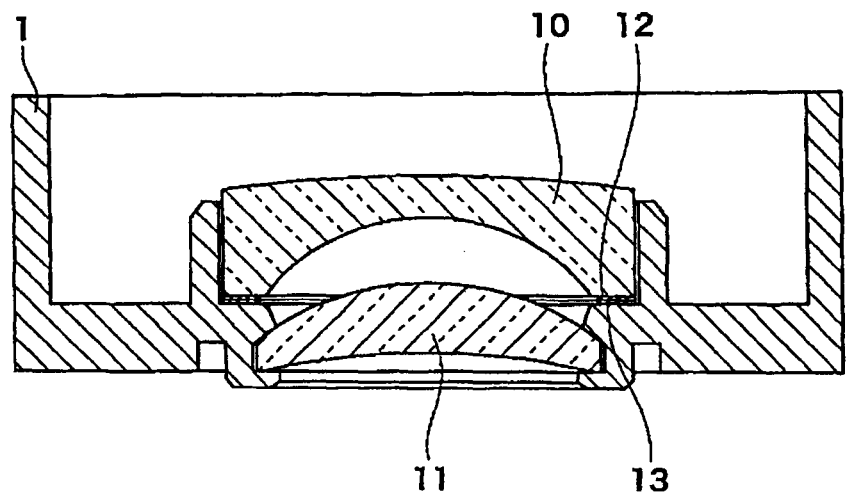
FIG. 2 is a sectional view showing a lens fixing portion to explain a lens fixing method that is Embodiment 1 of the present invention.
Figure 3:
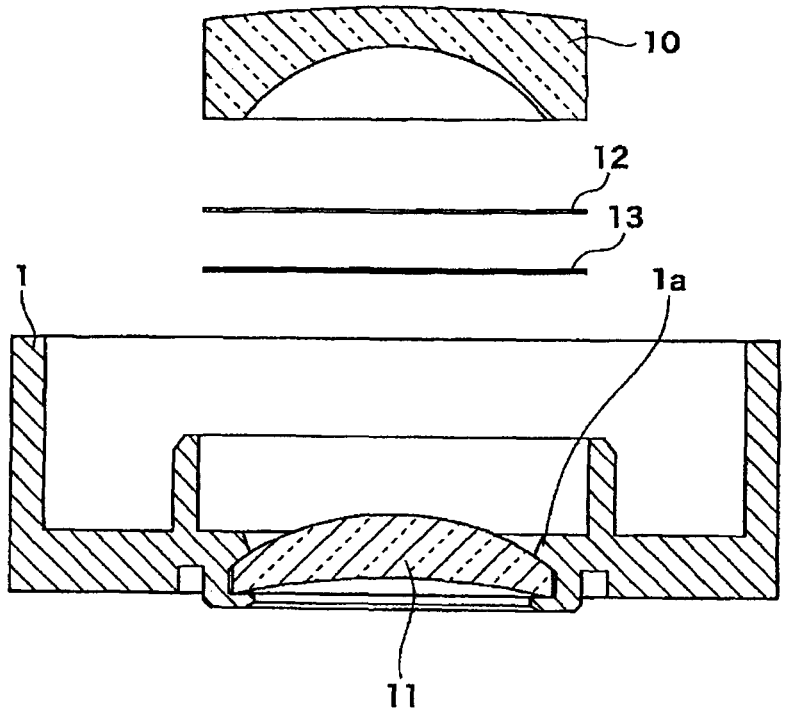
FIG. 3 is an exploded view of FIG. 2.
Figure 4:
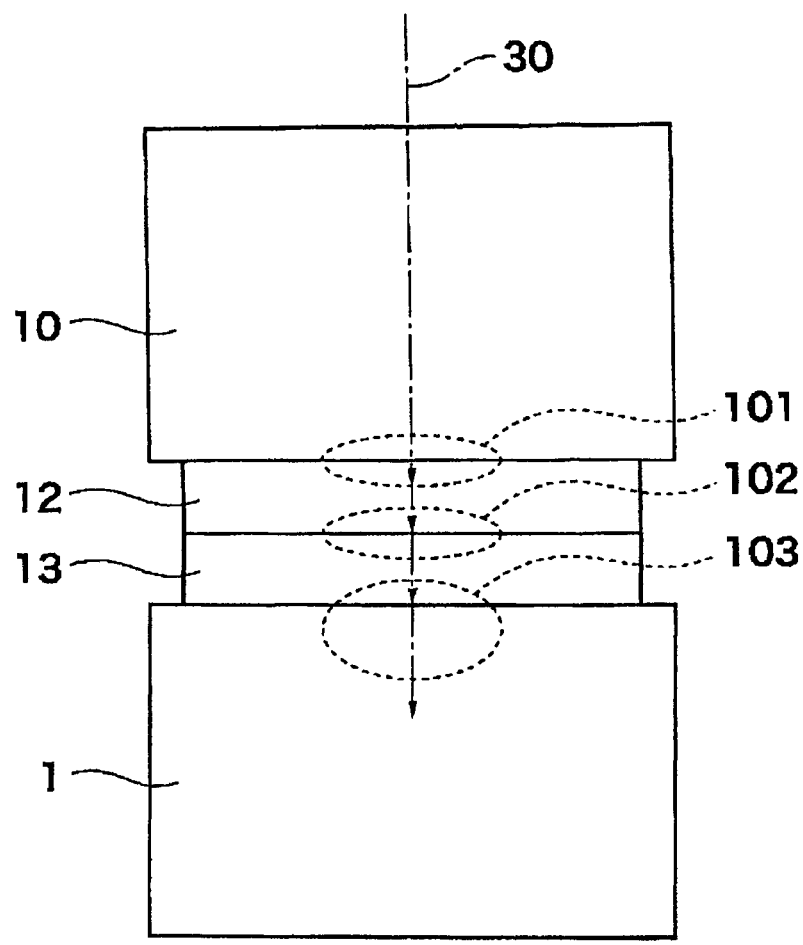
FIG. 4 is a figure schematically showing a laser weld portion by irradiation of infrared laser in Embodiment 1.
Figure 5:
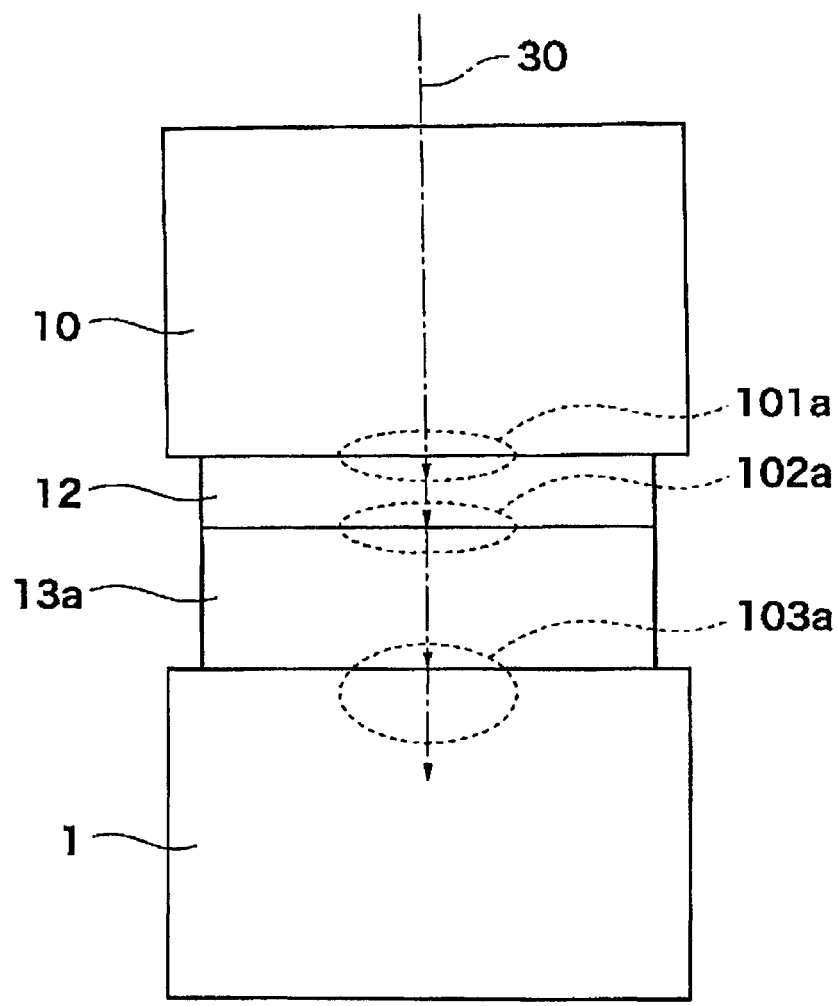
FIG. 5 is a figure schematically showing a laser weld portion by the irradiation of the infrared laser after performing spacing adjustment between a lens and a lens frame in Embodiment 1.
Figure 6:
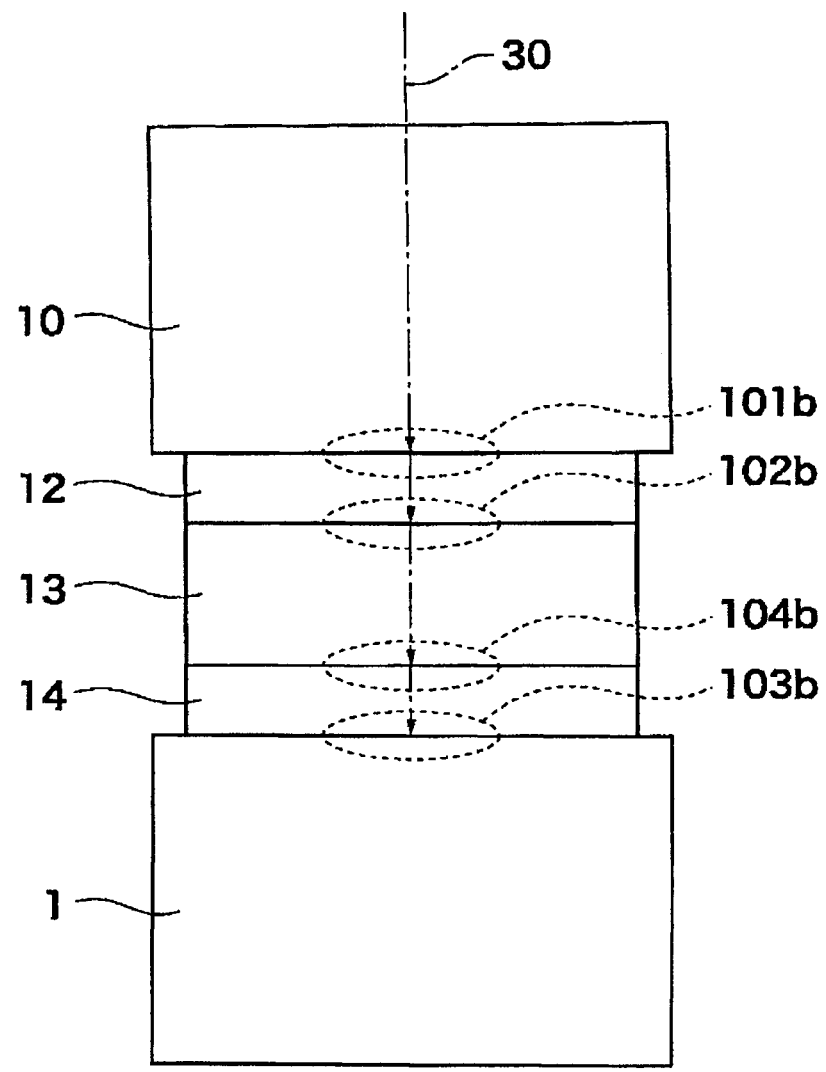
FIG. 6 is a figure schematically showing a laser weld portion by the irradiation of the infrared laser in a modified example of Embodiment 1.

FIG. 2 is a sectional view showing a lens fixing portion to explain the lens fixing method in Embodiment 1, and FIG. 3 is an exploded view of FIG. 2. FIG. 4 schematically shows a laser weld portion by irradiation of infrared laser, FIG. 5 schematically shows a laser weld portion by the irradiation of the infrared laser after performing spacing adjustment between a lens and a lens frame, and FIG. 6 schematically shows a modified example of Embodiment 1.

In the lens fixing method in Embodiment 1, a hot-melt sheet 12 (thermomelting member) and a laser-transmissive sheet 13 (spacing adjustment member) are disposed between the lens 10 and the lens frame (holding member) 1 as shown in FIGS. 2 and 3.

The hot-melt sheet 12 or the lens frame 1 is caused to generate heat by irradiation of infrared laser (laser light), and thereby the lens 10 is fixed to the lens frame 1 and the spacing between the lens frame 1 and the lens 10 is adjusted.

The hot-melt sheet 12 is formed of thermoplastic resin material and is in a solid state under room temperature without having adhesiveness. Further, the hot-melt sheet 12 is formed into a ring shape by a punching process, etc. to fix the outer circumferential portion of the lens 10.

Characteristics of the hot-melt sheet 12 include, for example, an elastic modulus of about 1 GPa and a thermal expansion coefficient of about 5 to 15 ($\times 10\text{-}5/^\circ$ C.).

Further, the hot-melt sheet 12 has a glass transition temperature of about 80 to 150° C. and, when it is heated above the glass transition temperature, it thermally melts and exerts adhesiveness, thereby producing an adhesive property due to an intermolecular force and an anchor effect, etc. between itself and the lens 10 being in contact therewith.

Furthermore, the thickness of the hot-melt sheet 12 is set to be about 10 μm to 50 μm so that dimensional changes in use environments will not affect the spacing accuracy between the lens 10 and the lens frame 1.

Considering the laser weldability, the laser-transmissive sheet 13 is preferably a transparent sheet made of the same resin as that of the lens frame 1, and transmits 80% or more of visible light and infrared light.

Specifically, the laser-transmissive sheet 13 is formed into a ring shape from a polycarbonate sheet with a thickness of about 10 μm to 70 μm in conformity with the outer circumferential shape of the lens 10 by a punching process or the like.

In this way, setting the thickness of the laser-transmissive sheet 13 to be 10 μm to 70 μm makes it possible to readily produce multiple types of the sheets with different thicknesses.

Moreover, making the laser-transmissive sheet 13 by using polycarbonate which is generally used for the lens frames of cameras to use the same material for the laser-transmissive sheet 13 and the lens frame 1 makes it possible to increase the welding strength.

As the infrared laser, a semiconductor laser or a YAG laser having a wavelength of 800 nm to 1100 nm is used.

As for the irradiation method of laser, in a simplest method, laser light output with about a few watts is focused into a spot having a diameter of about 0.2 mm to 1 mm and is scanned along the outer circumferential portion of the lens 10 at a velocity of several tens mm/sec.

Other examples of the laser irradiation method include a method in which laser light is formed into a ring shape and is irradiated onto the front face of the lens 10.

For example, laser light is entered into two opposing conical prisms to be formed into a ring shape with a width of about 0.2 to 1 mm in conformity with the outer circumferential shape of the lens 10, thereby simultaneously irradiating all around the outer circumferential portion of the lens 10. Besides, there is also an irradiation method which utilizes multiple-point irradiation by multiple laser light sources to provide a multi-point simultaneous processing capability.

Now, referring to FIG. 4, the procedure through which the lens 10 is fixed to the lens frame 1 by an infrared laser will be described.

FIG. 4 shows a schematic view of FIG. 2, in which the lens 10, the hot-melt sheet 12, the laser-transmissive sheet 13 and lens frame 1 are laminated in this order to be disposed in tight contact with each other.

When an infrared laser 30 is irradiated from above onto the lens 10, since the lens 10 hardly absorbs infrared rays, the laser 30 is transmitted through the lens 10 and enters the hot-melt sheet 12. Although the hot-melt sheet 12 normally has no infrared absorptivity, since there is an effect due to the scattering by the structural material, the incident energy into the laser-transmissive sheet 13 increases as the thickness thereof decreases.

Further, since the lens frame 1 contains carbon black, it absorbs infrared rays to generate heat. When the lens frame 1 is heated up without being sublimated so that the surface temperature thereof is about 150 to 250° C. by controlling the irradiation intensity and irradiation period of the laser, the resin at the surface will begin to melt.

Since this heat causes the laser-transmissive sheet 13 to be heated up as well and the surface thereof to be melt, the surfaces of the lens frame 1 and the laser-transmissive sheet 13 are melted and thereby fixed to each other. The weld portion at this moment is shown by reference numeral 103 in FIG. 4.

Moreover, the heat of the laser-transmissive sheet 13 also causes the hot-melt sheet 12 to be heated up (to be thermally melted) and to exert adhesiveness, and thereby a weld portion 102 with the laser-transmissive sheet 13 and a weld portion 101 with the lens 10 are produced.

Further, as described above, since the hot-melt sheet 12 has an adhesion temperature of about 80 to 150° C. approximately coinciding with the glass transition temperature thereof, it can exert a sufficient adhesiveness even when taking into consideration the losses due to the heat-generating temperature and heat conductance of the lens frame 1.

Furthermore, since the irradiation of the infrared laser 30 in a continuous ring shape along the outer circumferential portion of the lens 10 as described above allows the whole portion to be fixed simultaneously, it makes it possible to reduce the lens fixing time (joining time) and to maintain the lens positional accuracy.

Now, spacing adjustment between the lens 10 and the lens frame 1 will be described.

When it is desirable to increase the spacing between the lens 10 and the lens frame 1 from the state shown in FIG. 4, in place of the laser-transmissive sheet 13, a laser-transmissive sheet 13a made of the same material but with a different thickness is interposed between the lens frame 1 and the hot-melt sheet 12 as shown in FIG. 5. Only difference between FIGS. 4 and 5 is a 10 μm difference in the thicknesses of the laser-transmissive sheets to be interposed between the hot-melt sheet 12 and the lens frame 1.

In FIG. 5, the weld portion between the lens frame 1 and the laser-transmissive sheet 13a is designated with 103a, the weld portion between the hot-melt sheet 12 and the laser-transmissive sheet 13a with 102a, and the weld portion between the hot-melt sheet 12 and the lens 10 with 101a.

If the laser-transmissive sheet 13 is for example 15 μm in thickness and the laser-transmissive sheet 13a is 25 μm, the laser-transmissive sheet 13a can increase the spacing between the lens 10 and the lens frame 1 by 10 μm. Since the laser-transmissive sheet 13a exhibits an excellent infrared transmissivity and a thickness difference of several tens μm is a negligible amount in terms of the difference in heat transfer velocity, there will be no change in the fixing process of the lens 10 and the lens frame 1.

As for the spacing adjustment range between the lens 10 and the lens frame 1, it is normally sufficient if an error in a range of about 50 μm can be adjusted even with consideration of the finishing accuracy and combinations of parts. Thus, an error within about 10 μm will provide an optimal value which will not incur any optical problem.

For example, laser-transmissive sheets of 15 μm, 25 μm, 35 μm, 45 μm, 55 μm, and 65 μm thicknesses may be prepared. However, it is needless to say that any thickness and type of the laser-transmissive sheet may be optionally prepared.

As shown by the above description, since the condition of the laser-transmissive sheet will have no effect on the laser irradiation condition, even if a laser-transmissive sheet is placed to perform spacing adjustment between the lens 10 and the lens frame 1, there is no need of modifying the process of lens fixing.

Accordingly, arranging a hot-melt sheet 12 having the same thickness in the same condition even for a laser-transmissive sheet having a different thickness enables to perform spacing adjustment between the lens 10 and the lens frame 1 virtually without changing the laser irradiation condition. Moreover, even when no laser-transmissive sheet is inserted for spacing adjustment, the laser irradiation condition will not be changed.

Thus, in this embodiment, since the spacing between the lens 10 and the lens frame 1 can be adjusted virtually without changing the laser irradiation condition, a reduction of the fixing time of the lens 10 and an improvement of the positional accuracy of the lens 10 can be achieved at low cost.

Moreover, although in the above described embodiment the hot-melt sheet 12 has been described on an illustrative case in which it transmits infrared laser, the hot-melt sheet 12 may be provided with an infrared absorptivity by carbon black, etc. being dispersed therein.

In this case, the infrared laser transmitted through the lens 10 is absorbed by the hot-melt sheet 12, and thereby the hot-melt sheet 12 generates heat. This heat causes the hot-melt sheet 12 to exert adhesiveness and thereby the laser-transmissive sheet 13 is welded to the lens 10.

When all of the laser energy is not absorbed by the hot-melt sheet 12 and transmitted through the laser-transmissive sheet 13 to be irradiated onto the lens frame 1, the resin of the lens frame 1 will be melted by the laser energy absorbed by the carbon black of the lens frame 1 to be welded to the laser-transmissive sheet 13.

Such a process also makes it possible to fix the lens 10 onto the lens frame 1. Therefore, since there will be virtually no change in the process or the laser irradiation condition even when the thickness of the laser-transmissive sheet is changed by several tens of μm, the spacing adjustment between the lens 10 and the lens frame 1 is facilitated in a similar fashion as described above.

Moreover, in the above described embodiment, description has been made of the case in which the lens frame 1 is made of resin containing carbon black to provide an infrared absorptivity. Next, a case in which the lens frame is formed of a material having no infrared absorptivity will be described referring to FIG. 6.

As shown in FIG. 6, a first hot-melt sheet 12 and a laser-transmissive sheet 13 are disposed below the lens 10 and, further below them, a second hot-melt sheet 14 (second thermomelting member) in which carbon black, etc. is dispersed to provide an infrared absorptivity thereto is disposed and laminated to the lens frame 1 to be in tight contact therewith. Then, when infrared laser 30 is irradiated from above onto the lens 10, the laser 30 is transmitted through the hot-melt sheet 12 and the laser-transmissive sheet 13 to cause the hot-melt sheet 14 to generate heat, so that the hot-melt sheet 14 exerts adhesiveness.

Thereby, whether the lens frame 1 is made of metal or resin both of which have no infrared absorptivity, it will be welded with a hot-melt sheet 14 (weld portion 103*b*) without the lens frame 1 being melted.

Moreover, the hot-melt sheet 14 generating heat (thermally melting) is welded with the laser-transmissive sheet 13 (weld portion 104*b*) and further the hot-melt sheet 12 generating heat is also welded with the lens 10 and the laser-transmissive sheet 13 (weld portions 101*a* and 102*b*).

Further, the process of fixing lens is the same as in the above described embodiment even when the thickness of the laser-transmissive sheet 13 is changed, so that the spacing adjustment between the lens 10 and the lens frame 1 can be easily performed. Therefore, in the example in FIG. 6, since there is no limitation on the material of the lens frame 1, that is, there is no need of causing the lens frame 1 to generate heat or melting the surface thereof even when it is made of resin, an effect of stabilizing the dimensional accuracy can be obtained.

Furthermore, although in the above described embodiment, the hot-melt sheet 12 and the laser-transmissive sheet 13 are separate members, they may be integrated by laminating the both in advance, or may be integrated by coating or printing a hot-melt agent dissolved into a solvent, onto the surface of the laser-transmissive sheet 13.

Thus integrating the hot-melt member and the laser-transmissive sheet 13 eliminates the sheet reserving process, thereby enabling to improve the production efficiency and to maintain the spacing between the lens 10 and the lens frame 1 at a high accuracy.

Further, although in the above described embodiment, the hot-melt sheet 12 has been a punched sheet material, the hot-melt agent as being dissolved into a solvent, etc. may be coated and printed onto the lens 10 and the lens frame 1.

In this way, only the laser-transmissive sheet may be selectively assembled in the assembly process at the time of the spacing adjustment between the lens 10 and the lens frame 1, and therefore the production efficiency can be improved.

Embodiment 2

Next, referring to FIGS. 7 to 15, a lens fixing method in an optical apparatus that is Embodiment 2 of the present invention will be described.

Figure 7:
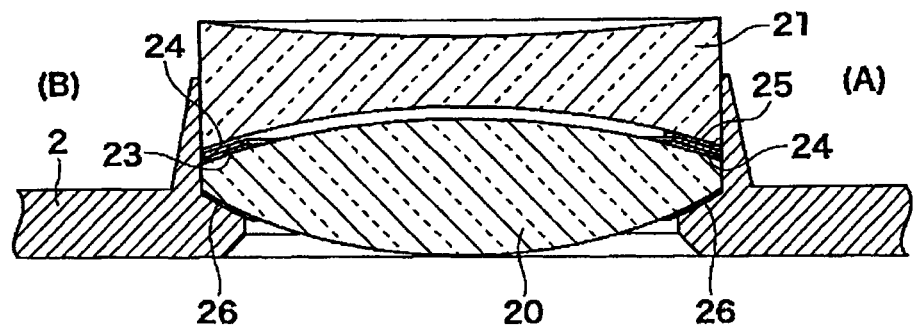
FIG. 7 is a sectional view showing a lens fixing portion to explain a lens fixing method that is Embodiment 2 of the present invention, the figure corresponding to a section taken along the X-X line in FIG. 11.
Figure 8:
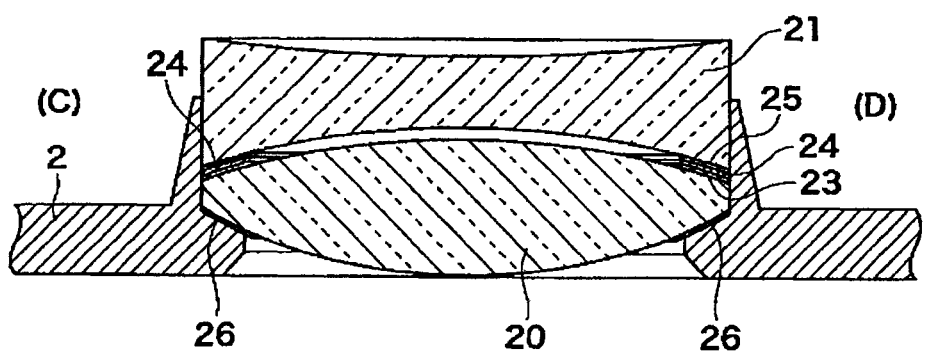
FIG. 8 is a sectional view showing the lens fixing portion to explain a lens fixing method in Embodiment 2, the figure corresponding to a section taken along the Y-Y line in FIG. 11.
Figure 9:
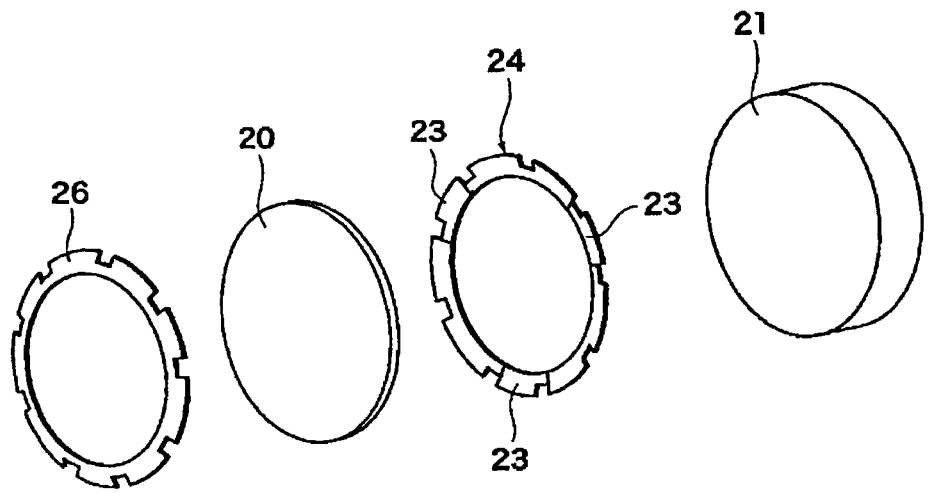
FIG. 9 is an exploded perspective view showing the lens unit of FIG. 7.
Figure 10:
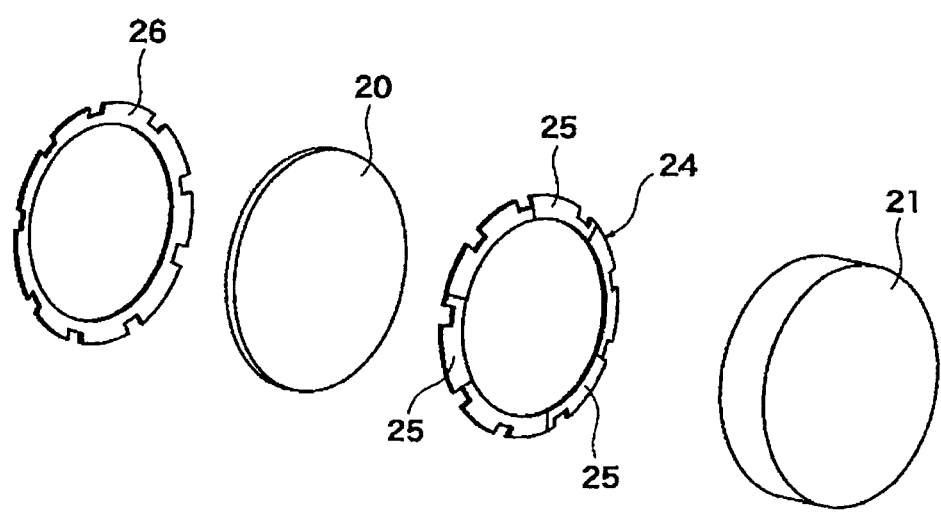
FIG. 10 is an exploded perspective view showing the lens unit of FIG. 7.
Figure 11:
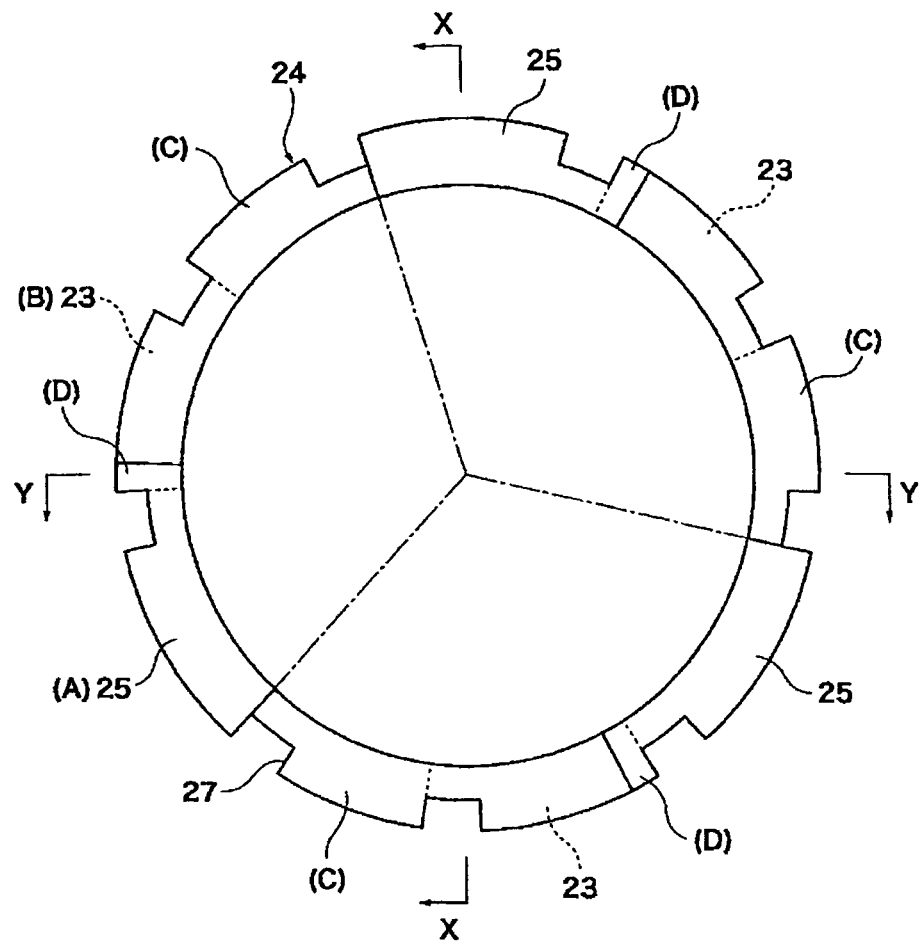
FIG. 11 is a plane view showing a laser-transmissive sheet in Embodiment 2.
Figure 12:
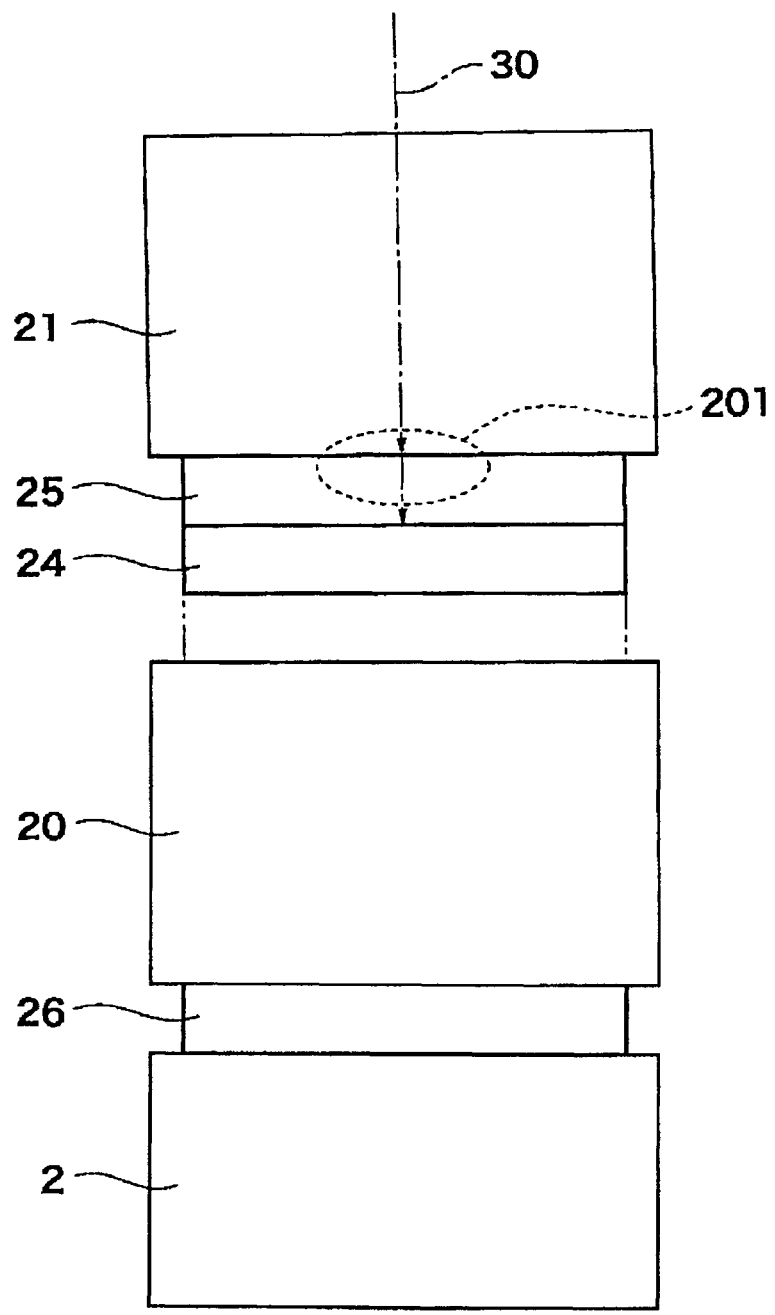
FIG. 12 is a figure schematically showing a laser weld portion by irradiation of infrared laser at a portion (A) in FIG. 7.
Figure 13:
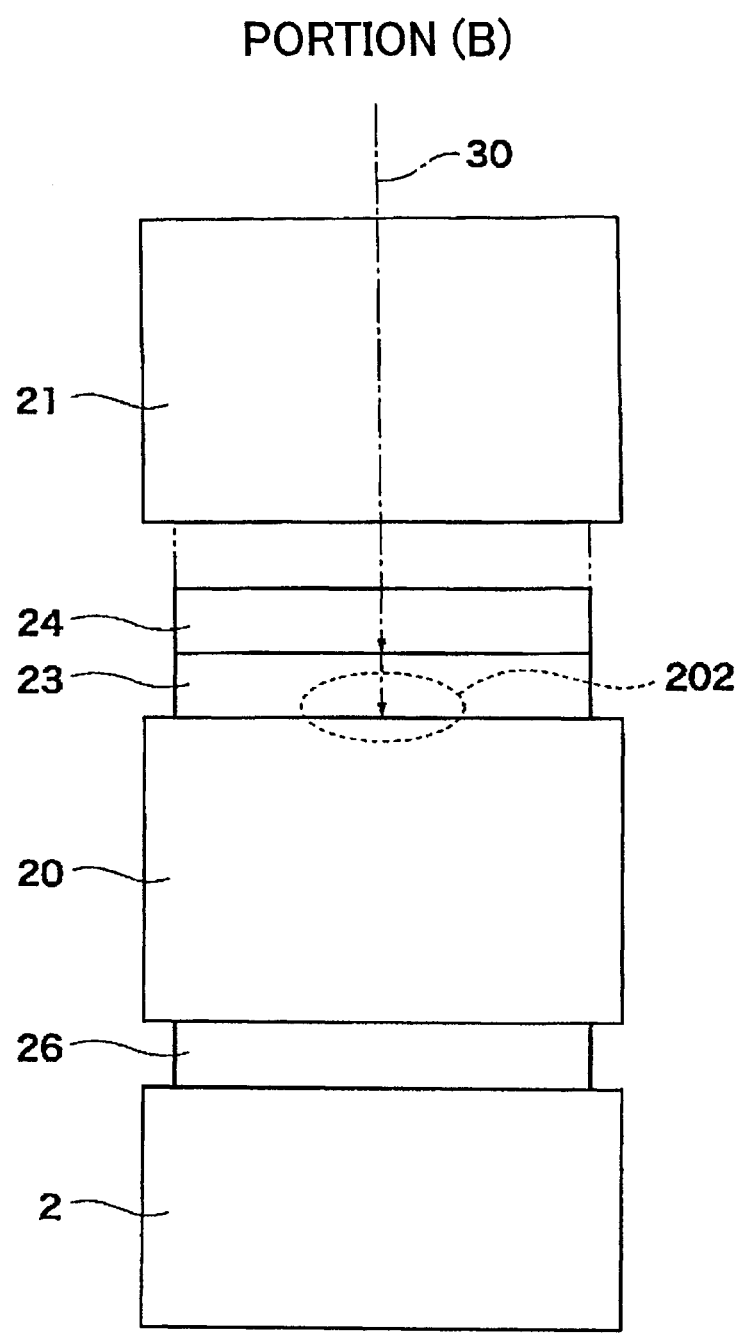
FIG. 13 is a figure schematically showing a laser weld portion by the irradiation of the infrared laser at a portion (B) in FIG. 7.
Figure 14:
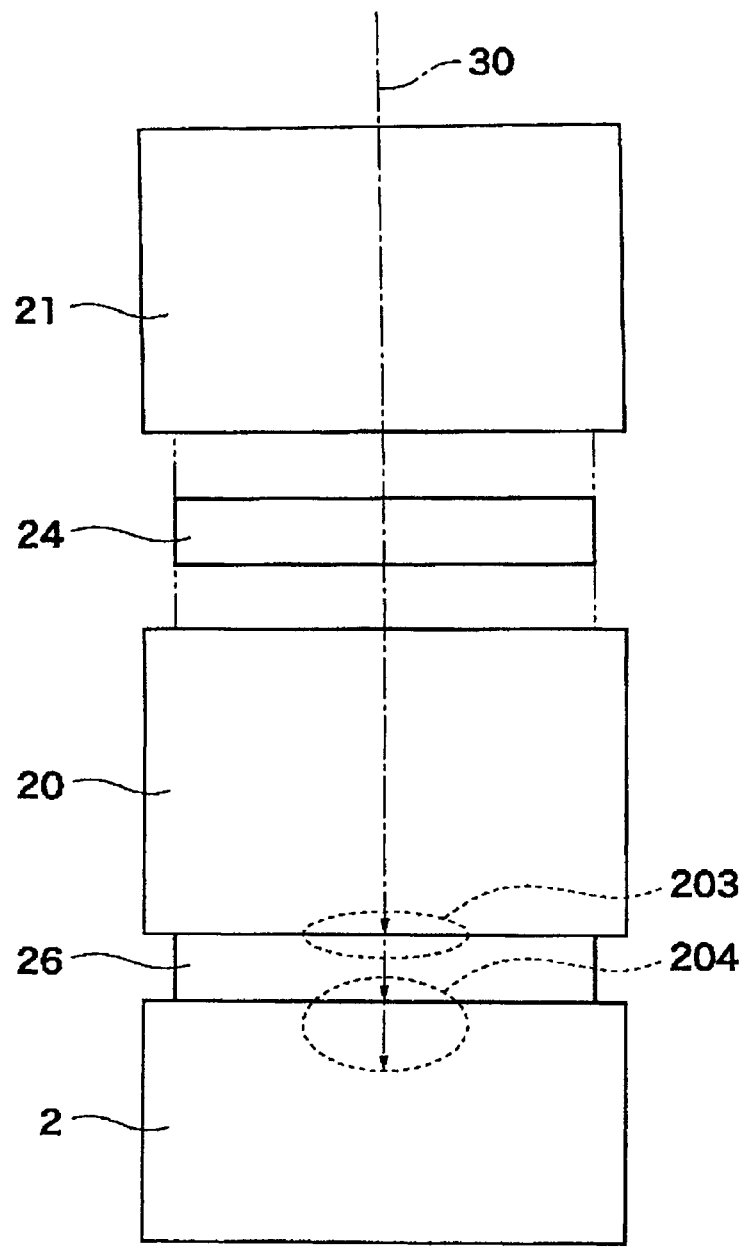
FIG. 14 is a figure schematically showing a laser weld portion by the irradiation of the infrared laser at a portion (C) in FIG. 8.
Figure 15:
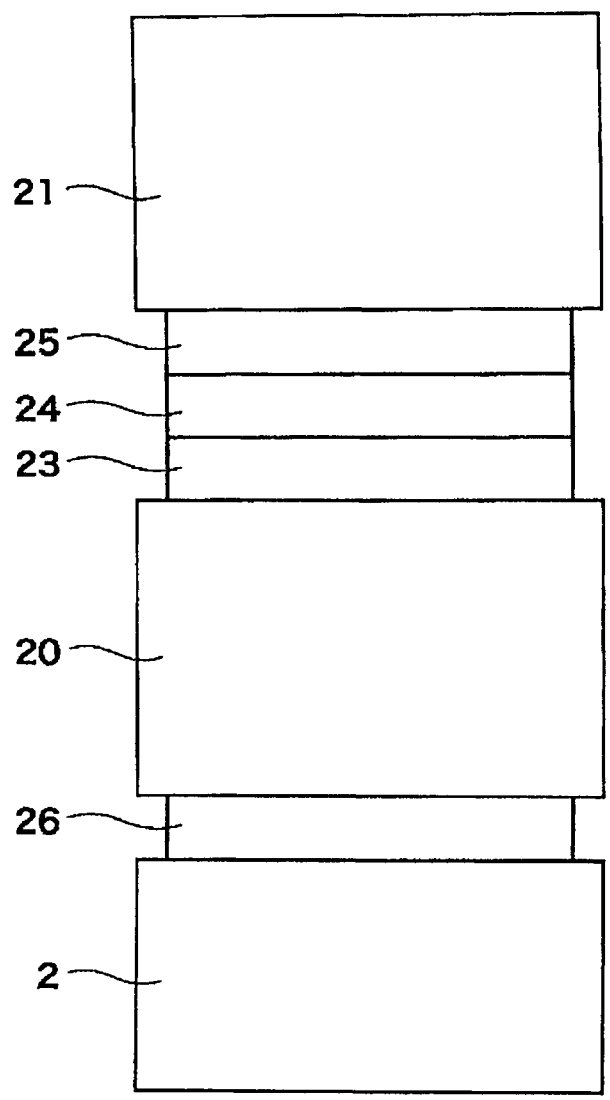
FIG. 15 is a figure schematically showing that infrared laser is not irradiated to a portion (D) in FIG. 8.

FIGS. 7 and 8 are sectional views showing a lens fixing portion to explain a lens fixing method of this embodiment. FIGS. 9 and 10 are exploded perspective views showing the lens unit shown in FIG. 7, and FIG. 11 is a plane view showing a laser-transmissive sheet. FIG. 12 schematically shows a laser weld portion by the irradiation of infrared laser at a portion (A) of FIG. 7 and FIG. 13 schematically shows a laser weld portion by the irradiation of infrared laser at a portion (B) of FIG. 7. FIG. 14 schematically shows a laser weld portion by the irradiation of infrared laser at a portion (C) of FIG. 8 and FIG. 15 schematically shows that an infrared laser is not irradiated at a portion (D) of FIG. 8. Moreover, explanation is omitted on the overlap parts with the above described Embodiment 1.

In the lens fixing method of this embodiment, a ring-shaped adhesive sheet 24 on each surface of which a hot-melt agent is coated or printed is disposed between a lens 21 and a lens 20 as shown in FIGS. 7 and 9.

Then, the hot-melt agent is caused to generate heat by the irradiation of infrared laser, and thereby the lens 21 is fixed to the lens 20 and the spacing between the lens 21 and the lens 20 is adjusted. Further, at the same time with this, the lens 20 is fixed to the lens frame 2.

The adhesive sheet 24 is a sheet made of resin having a laser transmissivity such as polyester or polycarbonate.

Moreover, in this embodiment, since the adhesive sheet 24 is not of a type which is melted by a laser welding method and joined with a lens frame or the like, its material includes a wider options than that of the laser-transmissive sheet in the above described Embodiment 1 and may be any material having a high laser transmissivity and a higher elastic modulus than that of the hot-melt agent. Setting a higher elastic modulus of the adhesive sheet 24 than that of the hot-melt agent enables to improve the positional accuracy of the lenses 20 and 21 when adjusting the spacing therebetween.

As shown in FIG. 9, on one surface of the adhesive sheet 24, a hot-melt agent 23 which is provided with an infrared absorptivity is integrated in a state being divided into three parts in the circumferential direction (each part has an angular range of about 30 to 60°) by coating, printing or the like.

Further, as shown in FIG. 10, on the other surface of the adhesive sheet 24, a hot-melt agent 25 which is provided with an infrared absorptivity is integrated in a state being divided into three parts in the circumferential direction (each part has an angular range of about 30 to 60°) by coating, printing or the like.

Moreover, the thicknesses of the hot-melt agents 23 and 25 are preferably about 5 µm to 20 µm with consideration given to dimensional accuracy. Further, the hot-melt agents 23 and 25 contain black pigments or dyes such as carbon black so as to be provided with absorptivity of infrared laser.

In this way, integrally disposing the hot-melt agents 23 and 25 each divided into three parts in the circumferential direction on each of the surfaces of the adhesive sheet 24 enables to maintain the height of the adhesive surface in the optical axis direction at a high accuracy and thereby to balance the adhesive property in the circumferential direction of the adhesive sheet 24.

As shown in FIG. 11, the hot-melt agents 23 and 25 respectively include, on each surface of the adhesion sheet 24, portions (B) and (A) which are provided at different phases from each other and portions (D) which are partially overlapped.

Further, the adhesive sheet 24 are provided in the circumferential direction with three portions (C) in which hot-melt agents 23, 25 are not provided on each surface. The portion (C) is a region through which most of the infrared laser will be transmitted when it is irradiated.

Furthermore, the adhesive sheet 24 is provided in the outer periphery portion with a plurality of notched parts 27 formed equiangularly, which enables to come into tight contact with an interface between itself and an R-shaped lens or an R-shaped lens frame.

FIG. 7 corresponds to the section taken along X-X line in FIG. 11, and FIG. 8 corresponds to the section taken along Y-Y line in FIG. 11.

Referring to FIGS. 7 and 12, when the infrared laser 30 is irradiated from above onto the lens 21, the laser 30 transmitted through the lens 21 is absorbed by the hot-melt agent 25 in the portion (A), so that the hot-melt agent 25 generates heat (thermally melts) to be welded with the lens 21 (weld portion 201 in FIG. 12).

Further, in the portion (B), the laser 30 transmitted through the adhesive sheet 24 is absorbed by the hot-melt agent 23 located in the interface between itself and the lens 20, so that the hot-melt agent 23 generates heat (thermally melts) to be welded with the lens 20 (weld portion 202 in FIG. 13).

Furthermore, even when the thickness of the adhesive sheet 24 is increased to adjust the spacing between the lens 21 and the lens 20, since the adhesive sheet 24 has a high laser transmissivity, there will be virtually no change in the laser energy reaching the hot-melt agent 23.

Further, since there will be no difference in adhesive strength between in the portion (A) and in the portion (B), there is no need at all to change laser irradiation conditions. Therefore, preparing a plurality of adhesive sheets 2 having different thicknesses enables to realize the facilitation of the spacing adjustment between the lens 21 and the lens 20 and the reduction of the lens fixing time.

Moreover, in the portion (D) in FIG. 8, the hot-melt agents 23 and 25 are partially overlapped on each surface of the adhesive sheet 24, and the lens 20 and the lens 21 are held by the lens frame 2 such that they are in tight contact with the hot-melt agents 23 and 25 without gaps.

Disposing a mask made of metal in the laser irradiation optical system such that the laser is not irradiated in the portion (D) (see FIG. 15) enables to position the lens 20 and the lens 21 while restricting the dimensional changes in their spacing, and thereby enabling to improve the accuracy of lens spacing adjustment.

Further, the portion (C) of FIG. 8 is, as described above, a region where the hot-melt agents 23 and 25 are not provided on each surface of the adhesive sheet 24, and when infrared laser is irradiated thereto, most of the laser light will be transmitted therethrough.

For this reason, when the infrared laser is irradiated from above onto the lens 21, the laser is transmitted through the adhesive sheet 24 and is irradiated onto the hot-melt sheet 26 disposed between the lens 20 and the lens frame 2.

Since the hot-melt sheet 26 has an infrared absorptivity and exerts adhesiveness by being caused to generate heat, the hot-melt sheet 26 is welded to the lens 20 and the lens frame 2 (weld portions 203 and 204 in FIG. 14).

Moreover, the hot-melt sheet 22 disposed between the lens 20 and the lens frame 2 may be a laser-transmissive sheet in which the hot-melt sheet 12 is disposed on the lens 20 side thereof as in the above described Embodiment 1.

In this case, varying the thickness of the laser-transmissive sheet enables to adjust the spacing between the lens 20 and the lens frame 2 without changing the irradiation conditions of the laser.

Thus, in this embodiment, the irradiation of the infrared laser can fix the lens 20 and the lens 21 while concurrently fixing the lens 20 and the lens frame 2.

Further, when it is desired to adjust the spacing between the lens 21 and the lens 20, just replacing the adhesive sheet 24 by one with a different thickness enables to change the spacing between the lens 21 and the lens 20, without changing the laser irradiation conditions.

Thereby, the reduction of the fixing time of the lenses 21 and 20 and the improvement of the positional accuracy of the lenses 21 and 20 can be realized at low cost.

Further, it is sufficient to provide in the lens frame 2 with a guide for lens assembly and a wall for light shielding upon fixing the lens 21 and the lens 20, and fixing the lens 20 and the lens frame 2.

This enables to place parts surrounding the lens frame 2 closer to the lens outer circumferential portion by omitting the lens outer circumferential wall or thinning it than before, thereby resulting in miniaturization of the lens barrel.

As described above, the above described each embodiment enables to adjust the spacing between the optical member and the holding member or between the optical members virtually without changing the irradiation conditions of the laser, thereby realizing the reduction of the fixing time and the improvement of the positional accuracy at low cost.

Moreover, embodiments of the present invention are not limited to the above described embodiments and can be appropriately modified without departing from the spirit of the present invention.

For example, although in the above described embodiment, the material of the lens is glass, there is no limitation on the material of the lens, and the lens made of resin may be used.

Further, although in the above described embodiments, description has been made of a case of fixing the lens and the lens frame and fixing the lenses, embodiments of the present invention are not limited to this case, but include cases of fixing a filter and a glass plate when the filter and the glass plate are fixed to a holding member.

Furthermore, the present invention is not limited to these preferred embodiments and various variations and modifications may be made without departing from the scope of the present invention.

This application claims foreign priority benefits based on Japanese Patent Application No. 2006-189623, filed on Jul. 10, 2006, which is hereby incorporated by reference herein in its entirety as if fully set forth herein.

What is claimed is:

1. An optical apparatus comprising:
    an optical member that transmits laser light;
    a holding member that holds the optical member and generates heat when irradiated with the laser light;
    a thermomelting member, which transmits the laser light and increases adhesiveness when heated, disposed between the optical member and the holding member; and
    a spacing adjustment member, which transmits the laser light, disposed between the thermomelting member and the holding member,
    wherein the spacing adjustment member has a thickness that achieves a desired spacing between the optical member and the holding member,
    wherein the laser light is transmitted through the optical member, the thermomelting member, and the spacing adjustment member to irradiate the holding member,
    wherein a weld portion welding the spacing adjustment member and the holding member is formed therebetween, by the heat generated at the holding member, and
    wherein the adhesiveness of the thermomelting member is increased by the heat generated at the holding member and transmitted to the thermomelting member via the spacing adjustment member to join the optical member and the spacing adjustment member together.

2. The optical apparatus according to claim 1, wherein the spacing adjustment member and the holding member are made of the same material.

3. The optical apparatus according to claim 1, wherein the holding member has absorptivity for infrared laser light.

4. An optical apparatus comprising:
    an optical member that transmits laser light;
    a holding member that holds the optical member;

a first thermomelting member, which transmits the laser light and increases adhesiveness when heated, disposed between the optical member and the holding member;
a spacing adjustment member, which transmits the laser light, disposed between the first thermomelting member and the holding member; and
a second thermomelting member, which generates heat and increases adhesiveness when irradiated with the laser light, disposed between the spacing adjustment member and the holding member,
wherein the spacing adjustment member has a thickness that achieves a desired spacing between the optical member and the holding member,
wherein the laser light is transmitted through the optical member, the first thermomelting member, and the spacing adjustment member to irradiate the second thermomelting member,
wherein the adhesiveness of the second thermomelting member is increased by the heat generated at the second thermomelting member to join the spacing adjustment member and the holding member together, and
wherein the adhesiveness of the first thermomelting member is increased by the heat generated at the second thermomelting member and transmitted to the first thermomelting member via the spacing adjustment member to join the optical member and the spacing adjustment member together.

5. The optical apparatus according to claim 4, wherein the second thermomelting member has absorptivity for infrared laser light.

6. An optical apparatus comprising:
a first optical member that transmits laser light;
a second optical member that transmits the laser light;
a first thermomelting member, which generates heat and increases adhesiveness when irradiated with the laser light, disposed between the first optical member and the second optical member;
a spacing adjustment member, which transmits the laser light, disposed between the first thermomelting member and the second optical member; and
a second thermomelting member, which generates heat and increases adhesiveness when irradiated with the laser light, disposed between the spacing adjustment member and the second optical member,
wherein the spacing adjustment member has a thickness that achieves a desired spacing between the first optical member and the second optical member,
wherein the laser light is transmitted through the first optical member to irradiate the first thermomelting member,
wherein the adhesiveness of the first thermomelting member is increased by the heat generated at the first thermomelting member to join the first optical member and the spacing adjustment member together,
wherein the laser light is transmitted through the first optical member and the spacing adjustment member to irradiate the second thermomelting member,
wherein the adhesiveness of the second thermomelting member is increased by the heat generated at the second thermomelting member to join the spacing adjustment member and the second optical member together,
wherein the laser light irradiated to the first thermomelting member is not irradiated to the second thermomelting member, and
wherein the laser light irradiated to the second thermomelting member is not irradiated to the first thermomelting member.

7. The optical apparatus according to claim 6, wherein the first thermomelting member and the second thermomelting member are disposed in different circumferential regions on each side of the spacing adjustment member.

8. The optical apparatus according to claim 6, wherein the first and second thermomelting members have absorptivity for infrared laser light.

9. A method of manufacturing an optical apparatus comprising:
a step of disposing an optical member that transmits laser light, a holding member that holds the optical member and generates heat when irradiated with the laser light, a thermomelting member, which transmits the laser light and increases adhesiveness when heated, disposed between the optical member and the holding member, and a spacing adjustment member, which transmits the laser light, disposed between the thermomelting member and the holding member, the spacing adjustment member having a thickness that achieves a desired spacing between the optical member and the holding member; and
a step of irradiating the laser light to the holding member through the optical member, the thermomelting member, and the spacing adjustment member,
wherein, in the irradiating step, a weld portion welding the spacing adjustment member and the holding member is formed therebetween by the heat generated at the holding member, and
wherein, in the irradiating step, the adhesiveness of the thermomelting member is increased by the heat generated at the holding member and transmitted to the thermomelting member via the spacing adjustment member to join the optical member and the spacing adjustment member together.

10. A method of manufacturing an optical apparatus comprising:
a step of disposing an optical member that transmits laser light, a holding member that holds the optical member, a first thermomelting member, which transmits the laser light and increases adhesiveness when irradiated with the laser light, disposed between the optical member and the holding member, a spacing adjustment member, which transmits the laser light disposed between the first thermomelting member and the holding member, the spacing adjustment member having a thickness that achieves a desired spacing between the optical member and the holding member, and a second thermomelting member, which generates heat and increases adhesiveness when irradiated with the laser light, disposed between the spacing adjustment member and the holding member; and
a step of irradiating the laser light to the second thermomelting member through the optical member, the first thermomelting member, and the spacing adjustment member,
wherein, in the irradiating step, the adhesiveness of the second thermomelting member is increased by the heat generated at the second thermomelting member to join the spacing adjustment member and the holding member together, and
wherein, in the irradiating step, the adhesiveness of the first thermomelting member is increased by the heat generated at the second thermomelting member and transmitted to the first thermomelting member via the spacing adjustment member to join the optical member and the spacing adjustment member together.

11. A method of manufacturing an optical apparatus comprising:

a step of disposing a first optical member that transmits laser light, a second optical member that transmits the laser light, a first thermomelting member, which generates heat and increases adhesiveness when irradiated with the laser light, disposed between the first optical member and the second optical member, a spacing adjustment member, which transmits the laser light disposed between the first thermomelting member and the second optical member, the spacing adjustment member having a thickness that achieves a desired spacing between the first optical member and the second optical member, and a second thermomelting member, which generates heat and increases adhesiveness when irradiated with the laser light, disposed between the spacing adjustment member and the second optical member; and a step of irradiating the laser light to the first and second thermomelting members, wherein, in the irradiating step, the laser light is transmitted through the first optical member to irradiate the first thermomelting member, wherein the adhesiveness of the first thermomelting member is increased by the heat generated at the first thermomelting member to join the first optical member and the spacing adjustment member together, wherein, in the irradiating step, the laser light is transmitted through the first optical member and the spacing adjustment member to irradiate the second thermomelting member, wherein the adhesiveness of the second thermomelting member is increased by the heat generated at the second thermomelting member to join the spacing adjustment member and the second optical member together, wherein, in the irradiating step, the laser light irradiated to the first thermomelting member is not irradiated to the second thermomelting member, and wherein, in the irradiating step, the laser light irradiated to the second thermomelting member is not irradiated to the first thermomelting member.

* * * * *